(12) United States Patent
Moon et al.

(10) Patent No.: US 9,590,505 B2
(45) Date of Patent: Mar. 7, 2017

(54) SWITCHING REGULATORS, POWER MANAGEMENT DEVICES AND SYSTEMS INCLUDING THE SAME

(71) Applicants: Sung-Woo Moon, Seongnam-si (KR); Hyun-Wook Yoo, Busan (KR); Yus Ko, Yongin-si (KR); Dong-Jin Keum, Suwon-si (KR); Pyung-Woo Yeon, Seoul (KR)

(72) Inventors: Sung-Woo Moon, Seongnam-si (KR); Hyun-Wook Yoo, Busan (KR); Yus Ko, Yongin-si (KR); Dong-Jin Keum, Suwon-si (KR); Pyung-Woo Yeon, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 109 days.

(21) Appl. No.: 14/542,806

(22) Filed: Nov. 17, 2014

(65) Prior Publication Data

US 2015/0263615 A1    Sep. 17, 2015

(30) Foreign Application Priority Data

Mar. 13, 2014    (KR) .................. 10-2014-0029676

(51) Int. Cl.
*H02M 3/156* (2006.01)
*H02M 3/158* (2006.01)
*H02M 1/00* (2006.01)

(52) U.S. Cl.
CPC ...... *H02M 3/158* (2013.01); *H02M 2001/008* (2013.01); *H02M 2001/0025* (2013.01); *H02M 2001/0045* (2013.01)

(58) Field of Classification Search
CPC . H02M 2001/0025; H02M 2001/0009; H02M 2001/0045; H02M 3/156; G05F 3/26; G05F 3/262
See application file for complete search history.

(56) References Cited

U.S. PATENT DOCUMENTS

| 5,672,993 | A | * | 9/1997 | Runaldue | .............. | G05F 3/262 |
| | | | | | | 323/315 |
| 7,436,163 | B2 | | 10/2008 | Katoh | | |
| RE41,304 | E | | 5/2010 | Matsuo et al. | | |

(Continued)

FOREIGN PATENT DOCUMENTS

| JP | 2008-043086 A | 2/2008 |
| JP | 2010-170364 A | 8/2010 |
| JP | 2013-084097 A | 5/2013 |

*Primary Examiner* — Harry Behm
(74) *Attorney, Agent, or Firm* — Harness, Dickey & Pierce

(57) ABSTRACT

A switching regulator includes a DC-DC converter and a dynamic voltage positioning circuit. The DC-DC converter includes an inductor connected between an input port and an output port. The dynamic voltage positioning circuit includes a sensing circuit and a mirroring circuit. The sensing circuit is configured to sense an inductor current flowing through the inductor, and to convert a voltage applied to a direct current resistance (DCR) of the inductor into a droop current using a variable resistor. The mirroring circuit is configured to cause a voltage drop at the output port of the DC-DC converter based on a current corresponding to a difference between a bias current and the droop current.

19 Claims, 10 Drawing Sheets

(56) References Cited

U.S. PATENT DOCUMENTS

| | | |
|---|---|---|
| 8,040,118 B2 | 10/2011 | Cho et al. |
| 8,305,066 B2 | 11/2012 | Lin et al. |
| 2002/0113583 A1* | 8/2002 | Kim .................. G05F 3/262 |
| | | 323/315 |
| 2004/0140845 A1 | 7/2004 | Eberlein |
| 2006/0022650 A1* | 2/2006 | Vinciarelli ............ H02M 1/36 |
| | | 323/266 |
| 2007/0188219 A1* | 8/2007 | Segarra ................ G01R 19/32 |
| | | 330/2 |
| 2009/0153108 A1* | 6/2009 | Hendin .................. H02J 1/08 |
| | | 323/234 |
| 2012/0262135 A1 | 10/2012 | Childs |
| 2013/0119954 A1 | 5/2013 | Lo |
| 2013/0300392 A1* | 11/2013 | Laur .................... H02M 3/156 |
| | | 323/284 |
| 2014/0021929 A1* | 1/2014 | Lin ...................... G05F 1/10 |
| | | 323/271 |

* cited by examiner

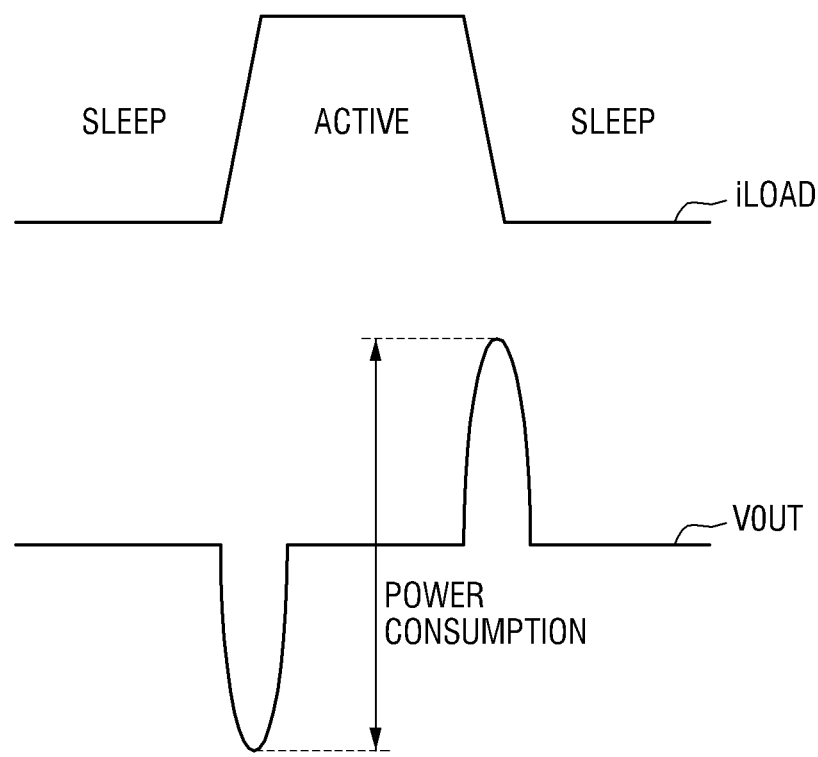

200

2000

3000

SWITCHING REGULATORS, POWER MANAGEMENT DEVICES AND SYSTEMS INCLUDING THE SAME

CROSS-REFERENCE TO RELATED APPLICATION(S)

This application claims priority under 35 U.S.C. §119 to Korean Patent Application No. 10-2014-0029676 filed on Mar. 13, 2014 in the Korean Intellectual Property Office, the entire contents of which are incorporated herein by reference.

BACKGROUND

Field

One or more example embodiments relate to switching regulators, power management devices and systems including the same.

Description of the Related Art

A power management integrated circuit (IC) is a device that manages battery power in a portable system that uses batteries. A power management IC may perform functions including DC-DC conversion, charging of batteries, voltage scaling, and so on.

One function of a power management IC is to increase battery power efficiency, and to drive multiple loads in a pipelined manner. To this end, a DC-DC converter having relatively high efficiency and that is capable of more freely adjusting an output voltage may be used. However, when driving a load consuming a relatively small amount of current, a low dropout (LDO) regulator having a smaller volume than the DC-DC converter may be more effectively used when taking into account spatial limitations and circuit complexity.

SUMMARY

One or more example embodiments provides switching regulators capable of improving (e.g., maximizing) power efficiency using multiple low dropout (LDO) regulators when driving a load consuming a relatively small amount of current.

One or more example embodiments also provide power management devices capable of improving (e.g., maximizing) power efficiency using multiple LDO regulators when driving a load consuming a relatively small amount of current.

One or more example embodiments also provide systems capable of improving (e.g., maximizing) power efficiency using multiple LDO regulators when driving a load consuming a relatively small amount of current.

These and other objects of inventive concepts will be described in or be apparent from the following description of example embodiments.

At least one example embodiment provides a switching regulator including: a DC-DC converter including an inductor connected between an input port and an output port of the DC-DC converter; and a dynamic voltage positioning circuit including a sensing circuit and a mirroring circuit. The sensing circuit is configured to sense an inductor current flowing through the inductor, and to convert a voltage applied to a direct current resistance (DCR) of the inductor into a droop current using a variable resistor. The mirroring circuit is configured to cause a voltage drop at the output port of the DC-DC converter based on a current corresponding to a difference between a bias current and the droop current.

At least one other example embodiment provides a switching regulator including: a step-down converter including an inductor connected between an input port and an output port, the step-down converter being configured to generate an output voltage at the output port based on an input voltage at the input port; and a dynamic voltage positioning circuit configured to generate a droop current based on a direct current resistance for the inductor, and to adjust the output voltage at the output port based on a current corresponding to a difference between a bias current and the droop current.

At least one example embodiment provides a power management device including: a switching sub-regulator connected to a battery and configured to convert a power voltage from the battery to generate a first output voltage at an output port; and a plurality of low dropout (LDO) regulators connected to the switching sub-regulator, the plurality of LDO regulators being configured to receive the first output voltage from the switching sub-regulator, and to convert the first output voltage to generate a second output voltage. The switching sub-regulator includes: a DC-DC converter including an inductor connected between an input port and the output port; and a dynamic voltage positioning circuit including a sensing circuit and a mirroring circuit. The sensing circuit is configured to sense an inductor current flowing through the inductor, and to convert a voltage applied to a direct current resistance (DCR) of the inductor into a droop current using a variable resistor. The mirroring circuit is configured to cause a voltage drop at the output port based on a current corresponding to a difference between a bias current and the droop current.

At least one example embodiment provides a power management device including: a switching sub-regulator connected to a battery and configured to convert a power voltage from the battery to generate a first output voltage at an output port; a plurality of low dropout (LDO) regulators connected to the switching sub-regulator, the plurality of LDO regulators being configured to receive the first output voltage from the switching sub-regulator, and to convert the first output voltage to generate a second output voltage; and a first DC-DC converter connected to the battery, and configured to convert the power voltage from the battery to generate a third output voltage. The switching sub-regulator includes: a second DC-DC converter including an inductor connected between an input port and the output port; and a dynamic voltage positioning circuit including a sensing circuit and a mirroring circuit. The sensing circuit is configured to sense an inductor current flowing through the inductor, and to convert a voltage applied to a direct current resistance (DCR) of the inductor into a droop current using a variable resistor. The mirroring circuit is configured to cause a voltage drop at the output port based on a current corresponding to a difference between a bias current and the droop current.

At least one other example embodiment provides a system including: a processor configured to process data; a memory configured to store the data; and a power management device configured to manage power supplied to the processor and the memory. The power management device includes: a switching sub-regulator connected to a battery and configured to convert a power voltage from the battery to generate a first output voltage at an output port; and a plurality of low dropout (LDO) regulators connected to the switching sub-regulator. The plurality of LDO regulators are configured to receive the first output voltage from the switching sub-regulator, and to convert the first output voltage to generate a second output voltage. The switching sub-regulator includes: a DC-DC converter including an inductor connected between an input port and the output port; and a dynamic voltage positioning circuit including a sensing circuit and a mirroring circuit. The sensing circuit is configured to sense an inductor current flowing through the inductor, and to convert a voltage applied to a direct current resistance (DCR) of the inductor into a droop current using a variable resistor. The mirroring circuit is configured to cause a voltage drop at the output port based on a current corresponding to a difference between a bias current and the droop current.

According to at least some example embodiments, the sensing circuit may include: a sense resistor and a sense capacitor connected between the input port and the output port of the DC-DC converter, the sense resistor and the sense capacitor also being connected in parallel with the inductor; and an operational amplifier having a first input port connected to a common node between the sense resistor and the sense capacitor, and having a second input port connected to the output port of the DC-DC converter through the variable resistor.

A voltage applied to the sense capacitor may be equal or substantially equal to the voltage applied to the DCR of the inductor.

A voltage applied to the variable resistor may be equal or substantially equal to the voltage applied to the DCR of the inductor.

The droop current may correspond to a current flowing through the variable resistor.

According to at least some example embodiments, the sensing circuit may further include: a first transistor having a gate connected to an output port of the operational amplifier, the first transistor being configured to selectively transfer the droop current based on an output of the operational amplifier.

The mirroring circuit may include: a first mirroring sub-circuit including a first transistor and a second transistor, the first mirroring sub-circuit being configured to generate a mirroring current by copying the droop current at a ratio of N:M; and wherein the mirroring circuit is configured to cause the voltage drop at the output port of the DC-DC converter based on a current corresponding to a difference between the bias current and the mirroring current.

The mirroring circuit may further include: a second mirroring sub-circuit including a third transistor and a fourth transistor, the second mirroring sub-circuit being configured to copy the mirroring current; a third mirroring sub-circuit including a fifth transistor and a sixth transistor, the third mirroring sub-circuit being configured to copy the current corresponding to the difference between the bias current and the mirroring current; and a bias current source configured to supply the bias current to a drain of the fourth transistor of the second mirroring sub-circuit and a drain of the fifth transistor of the third mirroring sub-circuit.

The mirroring circuit may further include: a low pass filter configured to remove noise from the droop current. The low pass filter may be connected between a gate of the first transistor and a gate of the second transistor of the first mirroring sub-circuit.

The dynamic voltage positioning circuit may further include: a switching circuit connected between the mirroring circuit and the output port of the DC-DC converter, the switching circuit being configured to switch the voltage drop caused by the mirroring circuit on and off. The DC-DC converter may further include: a first resistor and a second resistor connected to the output port; and wherein the switching circuit is connected to a common node between the first resistor and the second resistor.

The plurality of LDO regulators may have different current capacities. The switching sub-regulator may be configured to regulate the voltage drop according to a maximum current of a LDO regulator having a largest current capacity from among the plurality of LDO regulators.

According to at least some example embodiments, the dynamic voltage positioning circuit may be configured to adjust the output voltage at the output port by causing a voltage drop at the output port based on the current corresponding to the difference between the bias current and the droop current. The dynamic voltage positioning circuit may include a variable resistor, and the droop current may correspond to a current flowing through the variable resistor.

The dynamic voltage positioning circuit may include a sensing circuit configured to sense an inductor current flowing through the inductor, and to convert a voltage applied to the direct current resistance (DCR) of the inductor into the droop current using the variable resistor.

The dynamic voltage positioning circuit may further include: a first mirroring circuit configured to generate a first mirroring current based on the droop current; a second mirroring circuit configured to generate a second mirroring current by copying the first mirroring current; and a third mirroring circuit configured to generate the current corresponding to the difference between the bias current and the droop current by copying a current corresponding to the difference between the bias current and the second mirroring current.

BRIEF DESCRIPTION OF THE DRAWINGS

Example embodiments will become more apparent by describing in detail the example embodiments shown in the attached drawings in which:

FIG. 3A illustrates example output voltages of a general switching sub-regulator;

DETAILED DESCRIPTION

Figure 1:
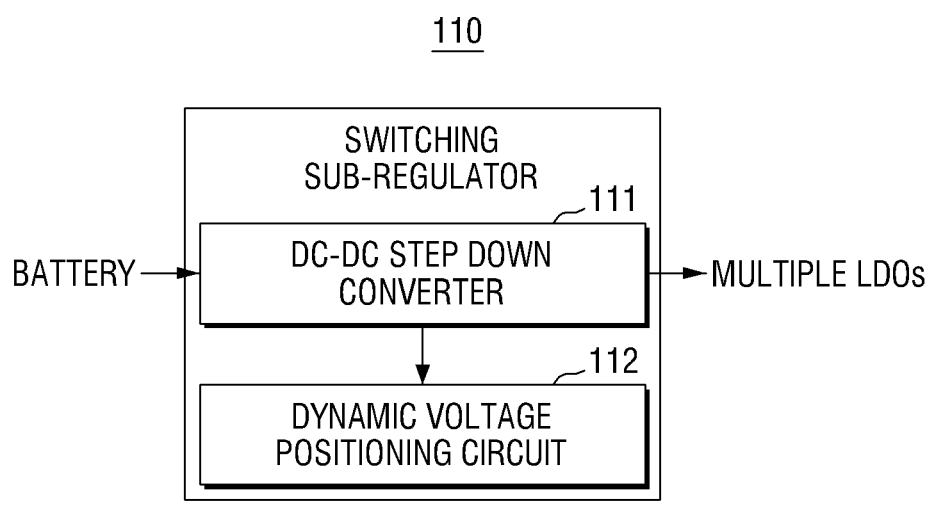
FIG. 1 is a block diagram of a switching sub-regulator according to an example embodiment.

Inventive concepts and methods of accomplishing the same may be understood more readily by reference to the following detailed description of example embodiments and the accompanying drawings. Inventive concepts may, however, be embodied in many different forms and should not be construed as being limited to the embodiments set forth herein. Rather, these embodiments are provided so that this disclosure will be thorough and complete and will fully convey inventive concepts to those skilled in the art. Inventive concepts should only be defined by the appended claims. Like reference numerals refer to like elements throughout the specification.

The terminology used herein is for the purpose of describing particular embodiments only and is not intended to be limiting of inventive concepts. As used herein, the singular forms "a", "an" and "the" are intended to include the plural terms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of inventive concepts.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

One or more example embodiments may be described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these embodiments should not be construed as limited to the particular shapes of regions illustrated herein but are to include deviations in shapes that result, for example; from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of inventive concepts.

Unless otherwise defined, all terms (including technical and scientific terms) used herein have the same meaning as commonly understood by one of ordinary skill in the art to which the inventive concepts belong. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Hereinafter, switching sub-regulators according to one or more example embodiments will be described in more detail.

Figure 2:
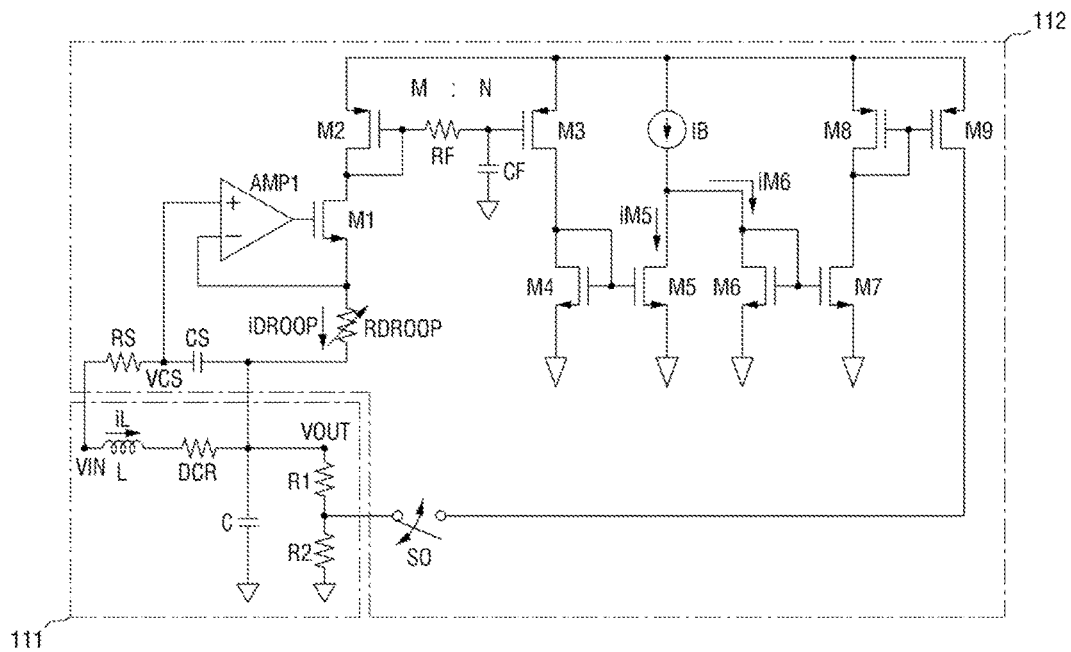
FIG. 2 is a circuit diagram for more specifically explaining the switching sub-regulator shown in FIG. 1.

FIG. 1 is a block diagram of a switching sub-regulator according to an example embodiment; and FIG. 2 is a circuit diagram for more specifically explaining the switching sub-regulator shown in FIG. 1.

Referring to FIGS. 1 and 2, the switching sub-regulator 110 according to an example embodiment may be connected to a battery, and may convert a power voltage from the battery to generate a first output voltage. The switching sub-regulator 110 may be connected to multiple LDO regulators. A power management device according to one or more example embodiments to be described later may perform voltage conversion in multiple steps. That is to say, for example, the switching sub-regulator 110 may primarily convert the power voltage of the battery to generate the first output voltage, and the LDO regulators connected to the switching sub-regulator 110 may secondarily convert the first output voltage to generate a second output voltage.

The switching sub-regulator 110 includes a DC-DC step down converter 111 and a dynamic voltage positioning circuit 112.

The DC-DC step down converter 111 may receive the power voltage from the battery and may step-down convert the received power voltage to generate the first output voltage. In so doing, the DC-DC step down converter 111 performs DC-DC conversion. Thus, the first output voltage and the power voltage from the battery are DC voltages, and a level of the first output voltage may be smaller than that of the power voltage from the battery.

In one example, a buck converter may be used as the DC-DC step down converter 111. The DC-DC step down converter 111 may include an inductor L and a capacitor C to perform voltage conversion. The inductor L may be connected between the input port and the output port of the DC-DC step down converter 111. The capacitor C may be connected to the output port of the DC-DC step down converter 111 in parallel. In FIG. 2, VIN denotes an input voltage of the DC-DC step down converter 111 (e.g., the power voltage of the battery), and VOUT denotes to an output voltage of the DC-DC step down converter 111 (e.g., the first output voltage). In addition, FIG. 2 shows the inductor L with a direct current resistance (DCR) of the inductor L. However, example embodiments are not limited to the example embodiments discussed herein. According to at least some other example embodiments, another type of converter, such as a buck-boost converter, may be used as the DC-DC step down converter 111.

The dynamic voltage positioning circuit 112 may adjust the output voltage of the DC-DC step down converter 111. That is to say, for example, the dynamic voltage positioning circuit 112 may cause a voltage drop at the output port of the DC-DC step down converter 111, and may adaptively vary the voltage drop. In another example, the dynamic voltage positioning circuit 112 may decrease the voltage at the output port of the DC-DC step down converter 111, and adaptively vary the amount of decrease of the voltage at the output port.

The dynamic voltage positioning circuit 112 may include a sensing unit (or circuit) sensing an inductor current iL flowing through the inductor L, and a mirroring unit (or circuit) causing a voltage drop at the output port of the DC-DC step down converter 111.

The sensing unit may include a sense resistor RS, a sense capacitor CS and a first operation amplifier AMP1.

The sense resistor RS and the sense capacitor CS may be connected in parallel with the inductor L between the input port and the output port of the DC-DC step down converter 111.

A first input port of the first operation amplifier AMP1 may be connected to a common node between the sense resistor RS and the sense capacitor CS, and a second input port of the first operation amplifier AMP1 may be connected to the output port of the DC-DC step down converter 111 through a variable resistor RDROOP. An output port of the first operation amplifier AMP1 may be connected to a gate of the first transistor M1.

Assuming VCS denotes a voltage of the common node between the sense resistor RS and the sense capacitor CS, the common node voltage VCS is calculated as shown below in Equation 1:

$$VCS = iL(sL + DCR)\frac{\frac{1}{sCS}}{RS + \frac{1}{sCS}} + VOUT \quad (1)$$
$$= iL(sL + DCR)\frac{1}{1 + sRSCS} + VOUT$$
$$= iLDCR\frac{1 + \frac{sL}{DCR}}{1 + sRSCS} + VOUT$$

where pole and zero positions may be matched to deduce Equation 2 as shown below:

$$\frac{sL}{DCR} = sRSCS \quad (2)$$

When Equation 2 is applied to Equation 1, the voltage VCS of the common node between the sense resistor RS and the sense capacitor CS can be expressed by Equation 3 shown below:

$$VCS = iLDCR + VOUT \quad (3)$$

Based on Equation 3, it can be understood that a voltage applied to both ends of the sense capacitor CS is equal or substantially equal to the voltage applied to the DCR of the inductor L. Accordingly, the inductor current iL may be more accurately sensed.

Meanwhile, use of an ideal operational amplifier model may make the voltage of the first input port of the first operation amplifier AMP1 equal or substantially equal to the voltage of the second input port of the first operation amplifier AMP1 by a virtual short of the first operation amplifier AMP1. Therefore, a voltage applied to both ends of the variable resistor RDROOP connected between the second input port of the first operation amplifier AMP1 and the output port of the DC-DC step down converter 111 becomes equal or substantially equal to the voltage applied to both ends of the sense capacitor CS. That is to say, for example, the voltage applied to both ends of the variable resistor RDROOP may also be equal or substantially equal to the voltage applied to the DR of the inductor L.

The voltage applied to both ends of the sense capacitor CS may be converted into a droop current iDROOP flowing in the variable resistor RDROOP by the variable resistor RDROOP, as expressed below in Equation 4:

$$iDROOP = \frac{VCS - VOUT}{RDROOP} \quad (4)$$
$$= \frac{iLDCR}{RDROOP}$$

The droop current iDROOP may be supplied to a mirroring circuit of the mirroring unit through the first transistor M1.

The mirroring unit may include a first mirroring circuit (also referred to herein as a first mirroring sub-circuit), a second mirroring circuit (also referred to herein as a second mirroring sub-circuit), a third mirroring circuit (also referred to herein as a third mirroring sub-circuit), and a fourth mirroring circuit (also referred to herein as a fourth mirroring sub-circuit). The mirroring unit may cause a voltage drop at the output port of the DC-DC step down converter 111 using a current corresponding to a difference between a bias current (described later) and the droop current iDROOP.

The first mirroring circuit may include a second transistor M2 and a third transistor M3. The second transistor M2 and the third transistor M3 may generate a mirroring current copied from the droop current iDROOP in a ratio of N:M, where the ratio N:M represents the transfer ratio of the first mirroring circuit. Magnitudes of the second transistor M2 and the third transistor M3 may be adjusted so as to perform current mirroring in a ratio of M:N.

The second mirroring circuit may include a fourth transistor M4 and a fifth transistor M5. The fourth transistor M4 and the fifth transistor M5 may copy the mirroring current again. Therefore, a current iM5 flowing through the fifth transistor M5, that is, a mirroring current, may be calculated as shown below in Equation 5:

$$iM5 = \frac{iLDCR}{RDROOP}\frac{N}{M} \quad (5)$$

The third mirroring circuit may include a sixth transistor M6 and a seventh transistor M7. The third mirroring circuit may copy a current corresponding to a difference between the bias current IB and the mirroring current iM5. To this end, a bias current source may supply the bias current IB to a drain of the fifth transistor M5 of the second mirroring circuit and a drain of the sixth transistor M6 of the third mirroring circuit. Therefore, the current iM6 flowing through the sixth transistor M6 may be calculated as shown below in Equation 6:

$$iM6 = IB - iM5 \quad (6)$$

The fourth mirroring circuit may include an eighth transistor M8 and a ninth transistor M9. The fourth mirroring circuit may copy the current iM6. The copied current, that is, a current corresponding to a difference between the bias current IB and the mirroring current iM5, may be supplied to the output port of the DC-DC step down converter 111 to cause a voltage drop.

In more detail, for example, a first resistor R1 and a second resistor R2 may be connected in parallel with the output port of the DC-DC step down converter 111, and an output port of the fourth mirroring circuit may be connected to a common node between the first resistor R1 and the second resistor R2. The current corresponding to a difference between the bias current IB and the mirroring current iM5 is induced in the second resistor R2 to cause a voltage drop at the output port of the DC-DC step down converter 111.

When a LDO regulator connected to the DC-DC step down converter 111 does not drive a load and the inductor current iL is about 0 (zero) A, the mirroring current iM5 may also be about 0 A as expressed in Equation 5 discussed above. Therefore, the current iM6 flowing through the sixth transistor may become equal or substantially equal to the bias current IB. In this case, the bias current IB may be copied by the fourth mirroring circuit. Eventually, when the LDO regulator does not drive a load, the voltage drop VDROP caused to the output port of the DC-DC step down converter 111 may be calculated as shown below in Equation 7:

$$VDROP = iM6R2 \quad (7)$$
$$= IBR2$$

When the LDO regulator connected to the DC-DC step down converter 111 drives a load relatively slowly and the inductor current iL increases, the mirroring current iM5 may not be 0 A, as expressed in Equation 5. In addition, according to the increase in the mirroring current iM5, the current iM6 flowing through the sixth transistor may decrease, as expressed in Equation 6. Therefore, when the LDO regulator drives a load, the voltage drop VDROP caused at the output port of the DC-DC step down converter 111 may be calculated as shown below in Equation 8:

$$VDROP = iM6R2 \quad (8)$$
$$= (IB - iM5)R2$$
$$= \left(IB - \frac{iLDCR}{RDROOP}\frac{N}{M}\right)R2$$

Therefore, when the LDO regulator does not drive a load, the bias current IB may be set (e.g., preset) in consideration of a dropout voltage of the LDO regulator and a transfer ratio of M:N, and a resistance value of the variable resistor RDROOP may be adjusted, thereby adaptively varying the output voltage according to the load driven by the LDO regulator and the dropout voltage of the LDO regulator.

According to at least some example embodiments, the fifth transistor M5 and the sixth transistor M6 may have a voltage limiting effect. For example, as a current consumed by a load (e.g., the inductor current iL) increases, the sixth transistor M6 cannot attenuate a current larger than the bias current IB, even if the mirroring current iM5 continuously increases. Accordingly, the current iM6 flowing through the sixth transistor M6 may become about 0 A. Therefore, since the voltage drop caused at the output port of the DC-DC step down converter 111 is about 0, the magnitude of the output voltage of the DC-DC step down converter 111 may not exceed that of the output voltage set as a default. In such a manner, the dynamic voltage positioning circuit 112 may also function as a voltage limiting circuit.

Still referring to FIG. 2, the dynamic voltage positioning circuit 112 may further include a low pass filter for removing switching noise of the switching sub-regulator 110. The low pass filter may include a resistor RF and a capacitor CF. The low pass filter may be connected between a gate of the second transistor M2 of the first mirroring circuit and a gate of the third transistor M3 of the first mirroring circuit, and may remove noise of the droop current iDROOP. In one example, a corner frequency of the low pass filter may be approximately ⅕ to ¹⁄₁₀ of a switching frequency of the switching sub-regulator 110, but example embodiments are not limited to this example.

In addition, the dynamic voltage positioning circuit 112 may include a switch unit (also referred to herein as a switching unit) for switching the voltage drop of the mirroring unit on and off. The switch unit may be connected between the mirroring unit and the output port of the DC-DC step down converter 111. The switch unit may include a switch S0 connected between an output port of the fourth mirroring circuit and a common node of the first resistor R1 and the second resistor R2. When the switch S0 is turned on, the output voltage of the DC-DC step down converter 111 may be regulated, whereas when the switch S0 is turned off, the output voltage of the DC-DC step down converter 111 may not be regulated.

Figure 3B:
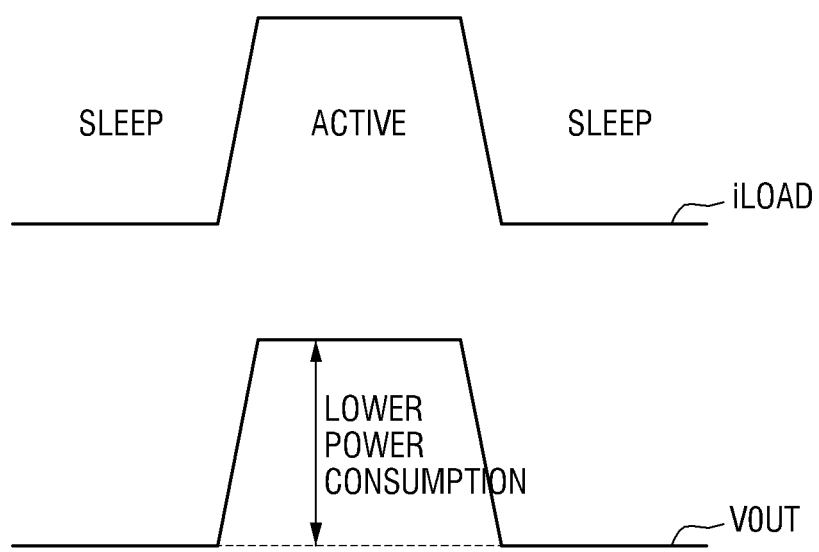
FIG. 3B illustrates example output voltages of the switching sub-regulator shown in FIG. 1.

FIG. 3A illustrates output voltages of a general switching sub-regulator. FIG. 3B illustrates output voltages of the switching sub-regulator shown in FIG. 1.

Waveforms at upper sides of FIGS. 3A and 3B are schematically illustrated waveforms of currents consumed by loads, and waveforms at lower sides of FIGS. 3A and 3B are schematically illustrated waveforms of output voltages of a switching sub-regulator varying according to the currents consumed by loads.

As shown in FIG. 3A, the output voltage VOUT of the general switching sub-regulator varies sharply and consumes power when the load is converted from a sleep state to an active state or vice versa.

However, as shown in FIG. 3B, in the switching sub-regulator 100 shown in FIG. 1, since the output voltage adaptively varies according to the current consumed by the load and a minimum dropout voltage of the LDO regulator, power consumption may be reduced and/or power efficiency may be improved (e.g., maximized).

Figure 4:
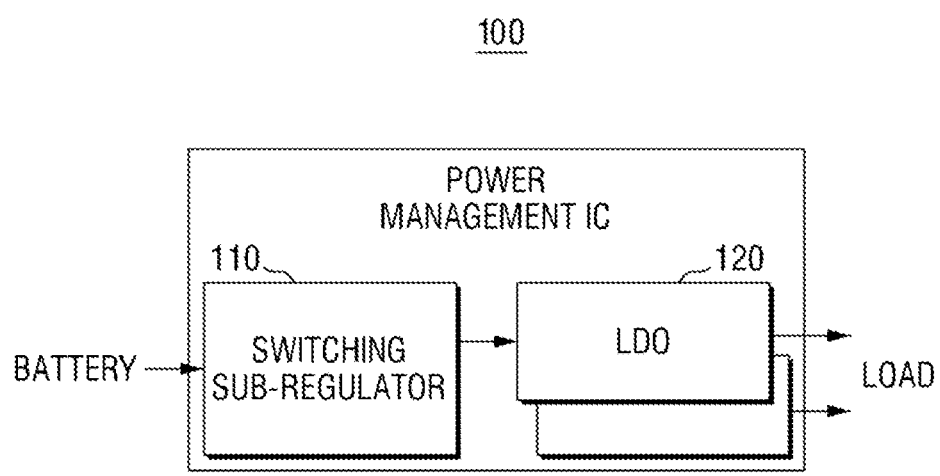
FIG. 4 is a block diagram illustrating an example embodiment of a power management integrated circuit (IC) including the switching sub-regulator shown in FIG. 1.
Figure 5:
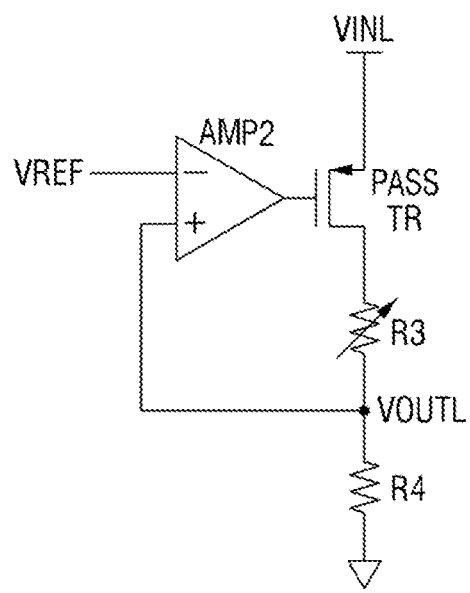
FIG. 5 is a circuit diagram for more specifically explaining an example embodiment of a low dropout (LDO) regulator of the power management IC shown in FIG. 4.

FIG. 4 is a block diagram illustrating an example embodiment of a power management integrated circuit (IC) including the switching sub-regulator shown in FIG. 1. FIG. 5 is a circuit diagram for more specifically explaining a LDO regulator of the power management IC shown in FIG. 4.

Referring to FIG. 4, the power management IC 100 includes a switching sub-regulator 110 and multiple (e.g., a plurality of) LDO regulators 120.

The switching sub-regulator 110 may be connected to a battery and may primarily convert a power voltage from the battery to generate a first output voltage. The switching sub-regulator 110 may be connected to the multiple LDO regulators 120.

The switching sub-regulator 110 may be configured in the same or substantially the same manner as described with reference to FIGS. 1 and 2.

The multiple LDO regulators 120 may secondarily convert the first output voltage to generate a second output voltage. Each of the LDO regulators 120 may supply each load driven thereby with the second output voltage.

Referring to FIG. 5, the LDO regulator 120 includes a second operation amplifier AMP2, a pass transistor PASS TR, a third resistor R3, and a fourth resistor R4. In FIG. 5, VINL denotes an input voltage of the LDO regulator 120 (e.g., the first output voltage from the switching sub-regulator 110), and VOUTL denotes to an output voltage of the LDO regulator 120 (e.g., the second output voltage).

A reference voltage VREF may be input to a first input port of the second operation amplifier AMP2. A second input port of the second operation amplifier AMP2 may be connected to a common node between the third resistor R3 and the fourth resistor R4. The second operation amplifier AMP2 may compare the reference voltage VREF with the output voltage VOUTL and may amplify a result of the comparison (i.e., the comparison result).

An output port of the second operation amplifier AMP2 may be connected to a gate of the pass transistor PASS TR. When an output voltage value of the second operation amplifier AMP2 is at a first level, the pass transistor PASS TR is turned on to increase the output voltage VOUTL. When output voltage value of the second operation amplifier AMP2 is at a second level, the pass transistor PASS TR is turned off to decrease the output voltage VOUTL.

The third resistor R3 and the fourth resistor R4 may function as feedback voltage divider(s).

The power efficiency of the LDO regulator 120 may be defined by an input voltage to output voltage ratio. Therefore, when the input voltage is the same or substantially the same as the output voltage, the power efficiency of the LDO regulator 120 may be improved and/or maximized. However, in order to maintain the output voltage of the LDO regulator 120 at a constant or substantially constant level (e.g., in order to maintain a dropout voltage of the pass transistor PASS TR at a constant or substantially constant level), the input voltage may be set to be higher than the output voltage with an appropriate margin. The minimum dropout voltage increases as an amount of current supplied from the LDO regulator 120 to the load increases.

In more detail, for example, when the LDO regulator 120 drives a relatively heavy load consuming a relatively large amount of current, an input voltage higher than the output voltage with an appropriate margin may be supplied to the LDO regulator 120. However, when the LDO regulator 120 drives a relatively light load consuming a relatively small amount of current, an input voltage of the LDO regulator 120 is set to be relatively high even if the dropout voltage is not so high, thereby lowering the power efficiency of the switching sub-regulator 110.

Referring again to FIG. 4, the power management IC 100 according to at least this example embodiment includes a switching sub-regulator 110 that is the same or substantially the same as that shown in FIGS. 1 and 2. Thus, using dynamic voltage positioning technique, when multiple LDO regulators drive relatively light loads, a first output voltage having a relatively low level is supplied, whereas when multiple LDO regulators drive relatively heavy loads, a first output voltage having a relatively high level is supplied, thereby improving and/or maximizing power efficiency.

Since the multiple LDO regulators 120 are connected to a single switching sub-regulator 110, it may be difficult (e.g., not possible) to detect how much current is consumed by each of the multiple LDO regulators 120 by only sensing an inductor current iL a the switching sub-regulator 110. In this regard, when respective LDO regulators 120 have different current capacities, more highly advanced voltage positioning technology may be necessary.

In the power management IC 100 according to at least this example embodiment, the maximum current of the LDO regulator having the largest current capacity from among the multiple LDO regulators is considered as the maximum current that can be supplied to each of the multiple LDO regulators 120, and the maximum dropout voltage is set according to the maximum current. For example, when the maximum current of a LDO regulator from among the LDO regulators 120 is 600 mA, the maximum current of another LDO regulator from among the LDO regulators 120 is 450 mA, and a current sensed from the switching sub-regulator 110 is 600 mA, the power management IC 100 may regulate the first output voltage of the switching sub-regulator 110 so as to allow the LDO regulator 120 supplying the current of 600 mA to secure an appropriate dropout voltage. Accordingly, dropout voltages of all of the LDO regulators 120 may be secured, irrespective of how much current is supplied from the other LDO regulators.

Meanwhile, even when the multiple LDO regulators 120 drive relatively light loads, the dropout voltage may be increased based on the LDO regulator having the largest current capacity from among the multiple LDO regulators 120. Here, the dropout voltage may be secured (e.g., all the time), irrespective of whether the multiple LDO regulators 120 drive relatively light loads or relatively heavy loads. Therefore, the power efficiency of the multiple LDO regulators 120 may be improved and/or maximized.

Figure 6:
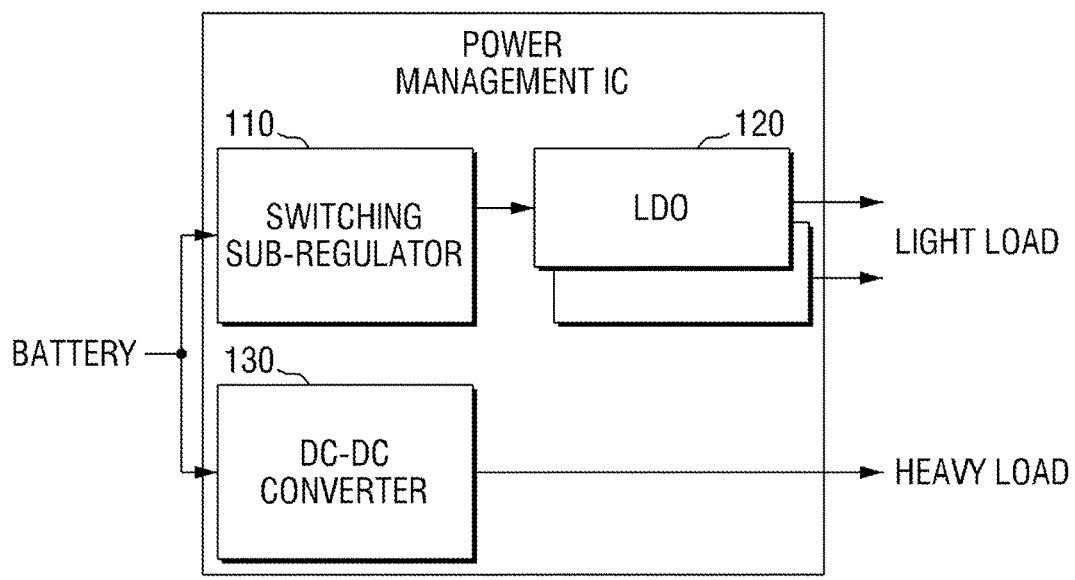
FIG. 6 is a block diagram illustrating an application example of a power management IC including the switching sub-regulator shown in FIG. 1.

FIG. 6 is a block diagram illustrating an application example of a power management IC including the switching sub-regulator shown in FIG. 1. For the sake of convenient explanation, the following description will focus on differences between the power management IC shown in FIG. 6 and the power management IC 100 shown in FIG. 4.

Referring to FIG. 6, the power management IC 200 includes a switching sub-regulator 110, multiple LDO regulators 120, and a DC-DC converter 130.

The switching sub-regulator 110 may be connected to a battery and may primarily convert a power voltage from the battery to generate a first output voltage. The switching sub-regulator 110 may be connected to the multiple LDO regulators 120.

The switching sub-regulator 110 may be configured in the same or substantially the same manner as the switching sub-regulator 110 described above with reference to FIGS. 1 and 2.

The multiple LDO regulators 120 may secondarily convert the first output voltage to generate a second output voltage. Each of the LDO regulators 120 may supply each load driven thereby with the second output voltage.

The DC-DC converter 130 may be connected to the battery and may convert the power voltage from the battery to generate a third output voltage. The DC-DC converter 130 may supply the load with the third output voltage. A buck converter or a buck-boost converter may be used as the DC-DC converter 130, but example embodiments are not limited thereto.

The multiple LDO regulators 120 may supply a relatively light load consuming a relatively small amount of current with the second output voltage, and the DC-DC converter 130 may supply a relatively heavy load consuming a relatively large amount of current with the third output voltage.

Figure 7:
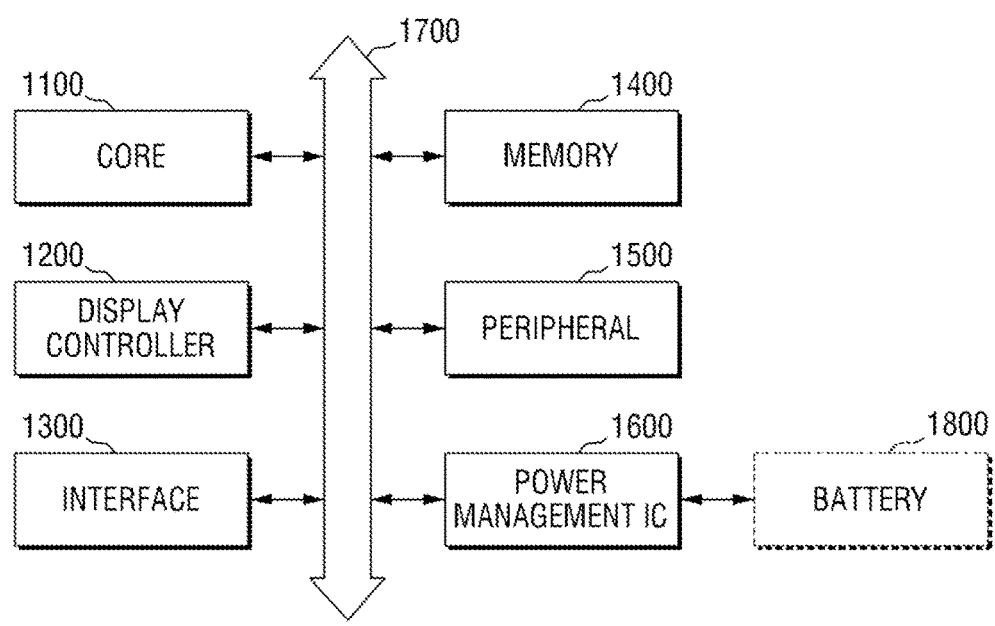
FIG. 7 is a block diagram illustrating a system including the power management IC shown in FIG. 4 or 6 and FIGS. 8 and 9 illustrate example electronic devices to which the system shown in FIG. 7 may be applied.

FIG. 7 is a block diagram of a system including the power management IC shown in FIG. 4 or 6.

Referring to FIG. 7, the system 1000 may include a core processor (CORE) 1100, a display controller 1200, an interface device (INTERFACE) 1300, a memory device (MEMORY) 1400, a peripheral device (PERIPHERAL) 1500, and a power management IC 1600.

The core processor 1100, the display controller 1200, the interface device 1300, the memory device 1400, the peripheral device 1500 and the power management IC 1600 may be connected to each other through the system bus 1700. The system bus 1700 may correspond to a path through which data moves.

The core processor 1100 may include a single core processor or a plurality of cores (multi core) processors. For example, the core processor 1100 may include a multi core processor, such as a dual core processor, a quad core processor, or a hexa core processor. Although not specifically shown in FIG. 7, the core processor 1100 may further include an internal and/or external cache memory.

The display controller 1200 controls a display device to display a picture or an image.

The interface device 1300 may transmit data to a communication network or may receive data from the communication network. For example, the interface device 1300 may include an antenna and/or a wired/wireless transceiver.

The memory device 1400 may be configured to store commands and/or data. For example, the memory device 1400 may include a volatile memory, such as a static random access memory (SRAM) or a dynamic random access memory (DRAM), or a non-volatile memory, such as a read only memory (ROM), an electrically erasable and programmable ROM (EEPROM), a flash memory, etc. However, example embodiments are not limited to these examples.

The peripheral device 1500 may include various devices, such as a serial communication device, a memory management device, an audio processor, and so on.

The power management IC 1600 may supply power to the core processor 1100, the display controller 1200, the interface device 1300, the memory device 1400 and the peripheral device 1500. The power management IC 1600 may be connected to the battery 1800 and may be supplied with a power voltage from the battery 1800.

The power management IC 1600 may be configured in the same or substantially the same manner as the power management IC 100 or 200 shown in FIG. 4 or 6.

Figure 8:
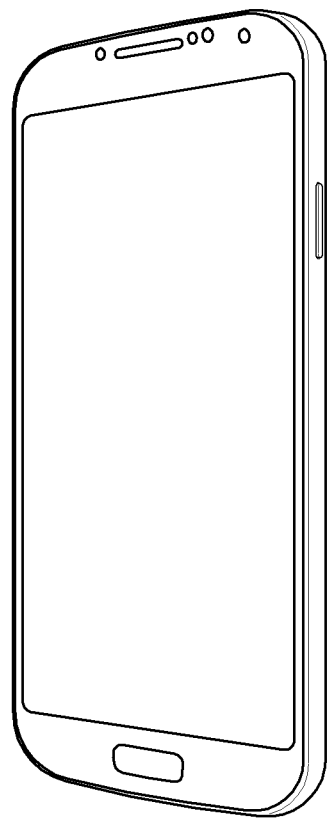
Figure 9:
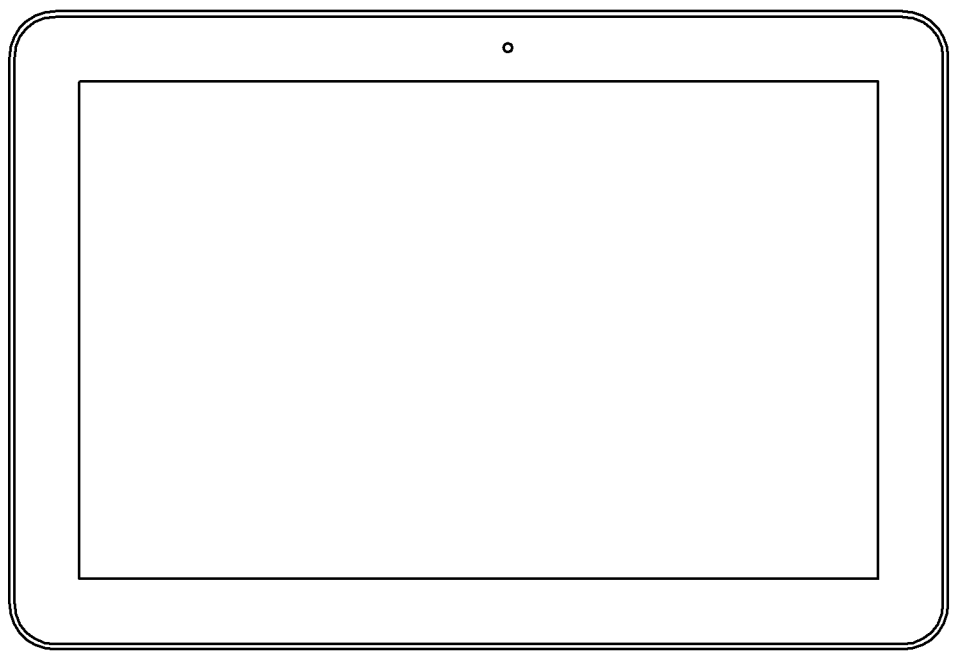

FIGS. 8 and 9 illustrate example electronic devices to which the system shown in FIG. 7 may be applied. More specifically, FIG. 8 illustrates a smartphone 2000 and FIG. 9 illustrates a tablet PC 3000.

The system 1000 shown in FIG. 7 may be provided as a component (e.g., a system on chip (SOC)) of an arbitrary portable system, such as the smartphone 2000 or the tablet PC 3000.

The system 1000 may also be applied, to other electronic devices not illustrated herein. For example, the system 1000 may be provided as a personal computer, an ultra-mobile personal computer (UMPC), a work station, a net-book, a personal digital assistant (PDA), a portable computer, a web tablet, a wireless phone, a mobile phone, an e-book, a portable multimedia player (PMP), a portable game console, a navigation device, a black box, a digital camera, a 2-dimensional or 3-dimensional (3D) television, a digital audio recorder, a digital audio player, a digital picture recorder, a digital picture player, digital video recorder, a digital video player, a device capable of transmitting/receiving information in wireless environments, one of various electronic devices constituting a home network, one of various electronic devices constituting a computer network, one of various electronic devices constituting a telematics network, radio-frequency identification (RFID) devices, embedded computing systems, etc.

Example embodiments described above in connection with inventive concepts may be embodied directly in hardware, in a software module executed by a processor, or in a combination of the two. A software module may reside in a random access memory (RAM), a flash memory, a read-only memory (ROM), an erasable programmable read-only memory (EPROM), an electrically erasable programmable read-only memory (EEPROM), a register, a hard disk, a removable disk, a compact disk read-only memory (CD-ROM), or any other form of storage medium known in the art. An example storage medium may be coupled to the processor, such that the processor can read information from, and write information to, the storage medium. Alternatively, the storage medium may be integral to the processor. Further, in some aspects, the processor and the storage medium may reside in an application-specific-integrated-circuit (ASIC). Additionally, the ASIC may reside in a user terminal. The processor and the storage medium may reside as discrete components in a user terminal.

While inventive concepts have been particularly shown and described with reference to example embodiments thereof, it will be understood by those of ordinary skill in the art that various changes in form and details may be made therein without departing from the spirit and scope of inventive concepts as defined by the following claims. It is therefore desired that the example embodiments be considered in all respects as illustrative and not restrictive, reference being made to the appended claims rather than the foregoing description to indicate the scope of inventive concepts.

What is claimed is:

1. A switching regulator comprising:
   a DC-DC converter including an inductor connected between an input port and an output port of the DC-DC converter; and
   a dynamic voltage positioning circuit including a sensing circuit and a mirroring circuit, the sensing circuit being configured to sense an inductor current flowing through the inductor, and to convert a voltage applied to a direct current resistance (DCR) of the inductor into a droop current using a variable resistor, and the mirroring circuit being configured to vary an output voltage of the DC-DC converter by causing a voltage drop at the output port of the DC-DC converter based on a current corresponding to a difference between a bias current and the droop current; wherein
   the dynamic voltage positioning circuit further includes a switching circuit connected between the mirroring circuit and the output port of the DC-DC converter, the switching circuit being configured to switch the voltage drop caused by the mirroring circuit on and off.

2. The switching regulator of claim 1, wherein the sensing circuit comprises:
   a sense resistor and a sense capacitor connected between the input port and the output port of the DC-DC converter, the sense resistor and the sense capacitor also being connected in parallel with the inductor; and an operational amplifier having a first input port connected to a common node between the sense resistor and the sense capacitor, and having a second input port connected to the output port of the DC-DC converter through the variable resistor.

3. The switching regulator of claim 2, wherein the sensing circuit further comprises:
a first transistor having a gate connected to an output port of the operational amplifier, the first transistor being configured to selectively transfer the droop current based on an output of the operational amplifier.

4. The switching regulator of claim 1, wherein the mirroring circuit comprises:
a first mirroring sub-circuit including a first transistor and a second transistor, the first mirroring sub-circuit being configured to generate a mirroring current by copying the droop current at a ratio of N:M; and
wherein the mirroring circuit is configured to cause the voltage drop at the output port of the DC-DC converter based on a current corresponding to a difference between the bias current and the mirroring current.

5. The switching regulator of claim 4, wherein the mirroring circuit comprises:
a second mirroring sub-circuit including a third transistor and a fourth transistor, the second mirroring sub-circuit being configured to copy the mirroring current;
a third mirroring sub-circuit including a fifth transistor and a sixth transistor, the third mirroring sub-circuit being configured to copy the current corresponding to the difference between the bias current and the mirroring current; and
a bias current source configured to supply the bias current to a drain of the fourth transistor of the second mirroring sub-circuit and a drain of the fifth transistor of the third mirroring sub-circuit.

6. The switching regulator of claim 1, wherein the mirroring circuit further comprises:
a low pass filter configured to remove noise from the droop current.

7. The switching regulator of claim 6, wherein the mirroring circuit further comprises:
a first mirroring sub-circuit including a first transistor and a second transistor, the first mirroring sub-circuit being configured to generate a mirroring current by copying the droop current at a ratio of N:M; and
wherein the low pass filter is connected between a gate of the first transistor and a gate of the second transistor.

8. The switching regulator of claim 1, wherein the DC-DC converter further comprises:
a first resistor and a second resistor connected to the output port; and wherein
the switching circuit is connected to a common node between the first resistor and the second resistor.

9. A power management device comprising:
a switching sub-regulator connected to a battery and configured to convert a power voltage from the battery to generate a first output voltage at an output port; and
a plurality of low dropout (LDO) regulators connected to the switching sub-regulator, the plurality of LDO regulators being configured to receive the first output voltage from the switching sub-regulator, and to convert the first output voltage to generate a second output voltage;
wherein the switching sub-regulator includes, a DC-DC converter including an inductor connected between an input port and the output port, and
a dynamic voltage positioning circuit including a sensing circuit and a mirroring circuit, the sensing circuit being configured to sense an inductor current flowing through the inductor, and to convert a voltage applied to a direct current resistance (DCR) of the inductor into a droop current using a variable resistor, and the mirroring circuit being configured to vary the first output voltage at the output port by causing a voltage drop at the output port based on a current corresponding to a difference between a bias current and the droop current; and
wherein the dynamic voltage positioning circuit further includes a switching circuit connected between the mirroring circuit and the output port, the switching circuit being configured to switch the voltage drop caused by the mirroring circuit on and off.

10. The power management device of claim 9, wherein the sensing circuit comprises:
a sense resistor and a sense capacitor connected between the input port and the output port, the sense resistor and the sense capacitor also being connected in parallel with the inductor; and
an operational amplifier having a first input port connected to a common node between the sense resistor and the sense capacitor, and a second input port connected to the output port through the variable resistor.

11. The power management device of claim 10, wherein a voltage applied to the sense capacitor and a voltage applied to the variable resistor are equal or substantially equal to the voltage applied to the DCR of the inductor.

12. The power management device of claim 10, wherein the sensing circuit further comprises:
a first transistor having a gate connected to an output port of the operational amplifier, the first transistor being configured to selectively transfer the droop current based on an output from the operational amplifier.

13. The power management device of claim 9, wherein the plurality of LDO regulators have different current capacities.

14. The power management device of claim 9, wherein the switching sub-regulator is configured to regulate the voltage drop according to a maximum current of a LDO regulator having a largest current capacity from among the plurality of LDO regulators.

15. A switching regulator comprising:
a step-down converter including an inductor connected between an input port and an output port, the step-down converter being configured to generate an output voltage at the output port based on an input voltage at the input port; and
a dynamic voltage positioning circuit configured to generate a droop current based on a direct current resistance for the inductor, and to adjust the output voltage at the output port by selectively applying a current to the output port, the current corresponding to a difference between a bias current and the droop current; wherein
the dynamic voltage positioning circuit includes at least one mirroring circuit and a switching circuit,
the switching circuit is connected between the at least one mirroring circuit and the output ort of the step-down converter, and
the switching circuit is configured to electrically disconnect the at least one mirroring circuit from the output port.

16. The switching regulator of claim 15, wherein the dynamic voltage positioning circuit is configured to adjust the output voltage at the output port by causing a voltage drop at the output port based on the current corresponding to the difference between the bias current and the droop current.

17. The switching regulator of claim 15, wherein:
the dynamic voltage positioning circuit includes a variable resistor; and
the droop current corresponds to a current flowing through the variable resistor.

18. The switching regulator of claim 17, wherein the dynamic voltage positioning circuit further comprises:
a sensing circuit configured to sense an inductor current flowing through the inductor, and to convert a voltage applied to the direct current resistance of the inductor into the droop current using the variable resistor.

19. The switching regulator of claim 15, wherein the at least one mirroring circuit comprises:
a first mirroring circuit configured to generate a first mirroring current based on the droop current;
a second mirroring circuit configured to generate a second mirroring current by copying the first mirroring current; and
a third mirroring circuit configured to generate the current corresponding to the difference between the bias current and the droop current by copying a current corresponding to the difference between the bias current and the second mirroring current.

* * * * *